(12) United States Patent
Bang et al.

(10) Patent No.: US 9,407,857 B2
(45) Date of Patent: *Aug. 2, 2016

(54) PROTECTION AGAINST UNAUTHORIZED COPYING OF DIGITAL MEDIAL COTENT

(75) Inventors: Young Jun Bang, Seoul (KR); Jun Sik Park, Seoul (KR); Jung Eun Kim, Seoul (KR); Sam Ryong Jang, Seoul (KR); Yun Geun Lee, Seoul (KR)

(73) Assignee: CDNetworks Co., Ltd, Seoul (KR)

( * ) Notice: Subject to any disclaimer, the term of this patent is extended or adjusted under 35 U.S.C. 154(b) by 646 days.

This patent is subject to a terminal disclaimer.

(21) Appl. No.: 12/201,930

(22) Filed: Aug. 29, 2008

(65) Prior Publication Data

US 2009/0064347 A1    Mar. 5, 2009

(30) Foreign Application Priority Data

| Aug. 29, 2007 | (KR) | 10-2007-0086901 |
| Aug. 29, 2007 | (KR) | 10-2007-0086902 |
| Aug. 29, 2007 | (KR) | 10-2007-0086903 |
| Aug. 29, 2007 | (KR) | 10-2007-0086905 |
| Aug. 29, 2007 | (KR) | 10-2007-0086910 |

(51) Int. Cl.

| *G06F 7/04* | (2006.01) |
| *H04N 5/76* | (2006.01) |
| *G06F 21/10* | (2013.01) |
| *G06Q 30/02* | (2012.01) |
| *H04N 7/16* | (2011.01) |
| *H04N 21/235* | (2011.01) |

(Continued)

(52) U.S. Cl.
CPC .............. *H04N 5/76* (2013.01); *G06F 21/10* (2013.01); *G06Q 30/0239* (2013.01); *H04N 7/162* (2013.01); *H04N 21/235* (2013.01); *H04N 21/2541* (2013.01); *H04N 21/41407* (2013.01); *H04N 21/435* (2013.01); *H04N 21/443* (2013.01); *H04N 21/818* (2013.01); *H04N 21/8355* (2013.01); *H04L 2463/101* (2013.01)

(58) Field of Classification Search
USPC ......................................................... 726/29
See application file for complete search history.

(56) References Cited

U.S. PATENT DOCUMENTS

| 7,093,296 B2 | 8/2006 | Nusser et al. |
| 7,155,744 B2 | 12/2006 | Schreiber et al. |

(Continued)

FOREIGN PATENT DOCUMENTS

| JP | 2001222405 | 8/2001 |
| JP | 2001325154 | 11/2001 |

(Continued)

OTHER PUBLICATIONS

Office Action mailed Dec. 19, 2008 for Korean Appl. No. 10-2007-0086910.

(Continued)

*Primary Examiner* — Viet Vu
*Assistant Examiner* — James Edwards
(74) *Attorney, Agent, or Firm* — Sutherland Asbill & Brennan LLP

(57) ABSTRACT

Protection against unauthorized copying of digital media content is achieved by receiving information from a client device related to its storing function used to store digital media content that is to be sent to the client device; and performing a procedure to protect against unauthorized copying of the digital media content if the client device is able to store the digital media content using its storing function.

15 Claims, 20 Drawing Sheets

(51) Int. Cl.
*H04N 21/254* (2011.01)
*H04N 21/414* (2011.01)
*H04N 21/435* (2011.01)
*H04N 21/443* (2011.01)
*H04N 21/81* (2011.01)
*H04N 21/8355* (2011.01)

(56) References Cited

U.S. PATENT DOCUMENTS

| | | | |
|---|---|---|---|
| 7,251,832 | B2 | 7/2007 | Venters, III et al. |
| 7,313,824 | B1 | 12/2007 | Bala et al. |
| 7,426,637 | B2 | 9/2008 | Risan et al. |
| 7,509,421 | B2 | 3/2009 | Lambert |
| 7,509,685 | B2 | 3/2009 | Lambert |
| 7,509,687 | B2* | 3/2009 | Ofek et al. .......... 726/30 |
| 7,680,937 | B2* | 3/2010 | Miller et al. .......... 709/226 |
| 2003/0145108 | A1* | 7/2003 | Joseph et al. .......... 709/239 |
| 2004/0039926 | A1 | 2/2004 | Lambert |
| 2004/0236945 | A1 | 11/2004 | Risan et al. |
| 2004/0255115 | A1* | 12/2004 | DeMello et al. .......... 713/156 |
| 2005/0086501 | A1* | 4/2005 | Woo et al. .......... 713/189 |
| 2005/0097355 | A1 | 5/2005 | England et al. |
| 2005/0229258 | A1 | 10/2005 | Pigin |
| 2006/0021057 | A1* | 1/2006 | Risan et al. .......... 726/26 |
| 2007/0256140 | A1 | 11/2007 | Venters, III |
| 2008/0027867 | A1* | 1/2008 | Forbes et al. .......... 705/51 |
| 2008/0034444 | A1* | 2/2008 | Sears .......... 726/29 |
| 2008/0320596 | A1 | 12/2008 | Wang et al. |
| 2009/0164794 | A1* | 6/2009 | Verosub et al. .......... 713/181 |
| 2010/0008500 | A1* | 1/2010 | Lisanke et al. .......... 380/201 |
| 2010/0106658 | A1* | 4/2010 | Stefik et al. .......... 705/310 |
| 2010/0235633 | A1* | 9/2010 | Asano et al. .......... 713/167 |

FOREIGN PATENT DOCUMENTS

| | | |
|---|---|---|
| JP | 2003316585 | 11/2003 |
| JP | 2004336576 | 11/2004 |
| JP | 2005227990 | 8/2005 |
| KR | 1020000002671 | 1/2000 |
| KR | 1020020020285 | 3/2002 |
| KR | 1020020029802 | 4/2002 |
| KR | 1020050000824 | 1/2005 |
| WO | 9737492 | 10/1997 |
| WO | 2007007112 A2 | 1/2007 |

OTHER PUBLICATIONS

Office Action mailed Apr. 16, 2009 for Korean Appl. No. 10-2007-0086902.
Office Action mailed Apr. 30, 2009 for Korean Appl. No. 10-2007-0086905.
International Search Report and Written Opinion issued on Aug. 27, 2008 for International Patent Application No. PCT/KR2008/005035.
International Searching Authority, "International Search Report and the Written Opinion," Korean PCT Application No. PCT/KR2008/005034, mailed Feb. 17, 2009.
Non-Final Office Action for U.S. Appl. No. 12/201,920 mailed Feb. 7, 2011.

* cited by examiner

PROTECTION AGAINST UNAUTHORIZED COPYING OF DIGITAL MEDIAL COTENT

CROSS REFERENCE TO RELATED APPLICATIONS

This application claims priority under 35 U.S.C. §119(a) to Korean Patent Applications KR 10-2007-0076901 filed on Aug. 29, 2007, KR 10-2007-0086902 filed on Aug. 29, 2007, KR 10-2007-0086903 filed Aug. 29, 2007, KR 10-2007-0086905 filed Aug. 29, 2007 and KR 10-2007-0086910 filed Aug. 29, 2007, the contents of which are hereby incorporated in their entirety

TECHNICAL FIELD

The present invention relates to protection against unauthorized copying of digital media content.

BACKGROUND

Unauthorized copying of digital media contents continues to be problematic. Certain types of technologies provide some means to cope with unauthorized copying of digital media content. However, such technologies are not adequate and thus, there is room for further improvements related to protection against unauthorized copying of digital media content.

SUMMARY OF INVENTION

An object of the present invention to provide a method that prevents (deters or restricts) unauthorized recording or storing of contents (e.g., digital media content).

Another object of the present invention to provide a method for preventing storage of content, which prevents contents from being copied even when the outputted contents itself are attempted to be copied.

Another object of the present invention to provide a method for preventing storage of content, which prevents contents from being copied without increasing the processing burden of a Central Processing Unit (CPU) in a client or client device.

Another object of the present invention to provide a method for preventing storage of content, which prevents video and/or audio data from being recorded even when there are difficulties in recording prevention due to newly developed recording schemes.

Another object of the present invention to provide a method for preventing storage of content, which prevents contents from being stored even when a copying prevention program is not installed in the client by the user.

Another object of the present invention to provide a method for preventing storage of contents, which prevents contents from being stored even if programs for storing contents defend themselves from being ended or stopped.

To achieve one of the objects of the present invention, as embodied and broadly described herein, there is provided a server comprising; a transceiver adapted to receive information from a client device related to its storing function used to store digital media content that is to be sent to the client device; and a processor cooperating with the transceiver to perform a procedure to protect against unauthorized copying of the digital media content, if the client device is able to store the digital media content using its storing function.

To achieve one of the objects of the present invention, as embodied and broadly described herein, there is provided a method of protecting digital media content performed by a server, the method comprising: receiving information from a client device related to its storing function used to store digital media content that is to be sent to the client device; and performing a procedure to protect against unauthorized copying of the digital media content, if the client device is able to store the digital media content using its storing function.

DETAILED DESCRIPTION

Figure 1:
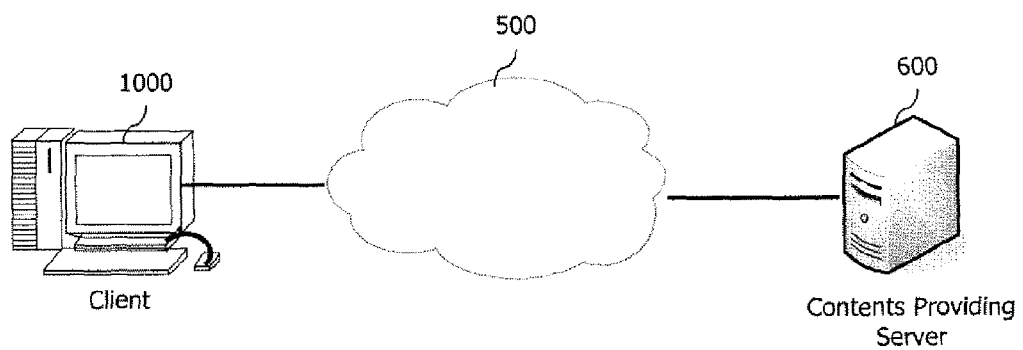
FIG. 1 is a view showing a contents providing system according to an exemplary embodiment.

Reference will now be made in detail to some embodiments, examples of which are illustrated in the accompanying drawings.

Though the present invention may be variously modified and have several embodiments, specific embodiments will be shown in drawings and be explained in detail. However, the present invention is not meant to be limited, but it is intended that various modifications, equivalents, and alternatives are also covered within the scope of the claims.

Although terms of 'first', 'second', etc. are used to explain various components, the components are not limited to such terms. These terms are used only to distinguish one component from another component. For example, a first component may be referred to as a second component, or similarly, the second component may be referred to as the first component within the scope of the present invention.

The term 'and/or' is used to include a combination of a plurality of disclosed items or one of the items.

When it is mentioned that one component is "connected" or "accessed" to another component, it may be understood that the one component is directly connected or accessed to the another component or that still other component is interposed between the two components.

Also, when it is mentioned that one component is "directly connected" or "directly accessed" to another component, it may be understood that no component is interposed therebetween.

Terms used herein are to merely explain certain embodiments, not meant to limit the scope of the present invention.

A singular expression includes a plural concept unless there is a contextually distinctive difference therebetween. In this description, the term "include" or "have" is intended to indicate that characteristics, numbers, steps, operations, components, elements, etc. disclosed in the specification or combinations thereof exist. As such, the term "include" or "have" should be understood that there are additional possibilities of one or more other characteristics, numbers, steps, operations, components, elements or combinations thereof.

Unless specifically defined, all the terms used herein including technical or scientific terms have the same meaning as terms generally understood by those skilled in the art.

Terms defined in a general dictionary should be understood so as to have the same meanings as contextual meanings of the related art. Unless definitely defined in the present invention, the terms are not interpreted as ideal or excessively formal meanings.

Hereinafter, certain embodiments of the present invention will be explained in more detail with reference to the attached drawings. The same component or components corresponding to each other will be provided with the same reference numeral, and their detailed explanation will be omitted. Hereinafter, the term of 'content' will be described.

There are various types of digital media content(s) including image(s) (for example, still images such as photos and moving images such as videos), animation, graphics, digital music files, and the like. User created contents (UCC) are one type of digital media contents that are becoming more popular.

In the case of storing moving images or still images, storing the moving images into moving images is called as 'video recording' (will be abbreviated as 'recording'), while storing the moving images or the still images into still images is called as 'capture'. However, only the term 'recording' will be used to refer to both types of image recording procedures.

Such digital media contents can be transferred (i.e. transmitted or received) via the Internet or other type of network (such as, OMA, 3GPP, 3GPP2, etc.) using wired or wireless access techniques.

FIG. 1 is a view showing a contents (image, video, audio, etc.) providing system according to the present invention. As shown, the contents providing system comprises a client 1000, and a contents server (or a contents providing server) 600.

The client 1000 sends a request for one or more contents (e.g., image, video, audio, etc) to the contents server 600 through a communication network 500. Then, the client 1000 receives the contents from the contents server 600.

In below, it will be explained focusing on image as an example of the contents However, It can be understood that the present invention should not be interpreted as relating to only image, Also It can be understood that image includes not only still image, but also moving image. Even if image (visual data) is applied to preferred embodiments of the present invention, audio data may also be applied thereto.

Figure 4:
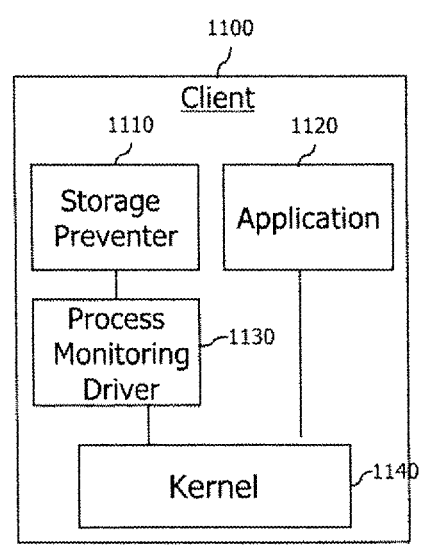
FIG. 4 is a detailed block diagram of the client of FIG. 1 according to an exemplary embodiment.

The client 1000 may include a web browser to allow connection to the contents server 600, and an application software programs 1120 of FIG. 4 required to reproduce the contents, e.g., image. Here, the web browser and the application may be installed at the client 1000 in the form of software programs or codes.

Also, the client 1000 is not limited in any manner (i.e., various types of devices may function as the client 1000), as long as such device includes a communication function that allows access to the contents server 600, includes a program installed therein that allows reproduction of received contents, and includes a display screen that outputs the reproduced contents.

The client 1000 may be implemented as a non-movable device such as a personal computer (PC) and the like, or a mobile device such as a portable phone, a personal digital assistant (PDA), a smart phone, and the like.

The client 1000 may comprise a launching module that operates (or activates) a contents reproduction program or application required to reproduce the contents (e.g., a launching module for activating a video playback program). Accordingly, when the user requests sending of contents from the contents server 600 and then receives the contents, a reproduction program for the contents can be operated.

Also, the client 1000 may comprise a launching module for operating (activating) a storage prevention program (or recording prevention program) of contents when a user requests sending of contents. Accordingly, when the user requests sending of contents from the contents server 600, the storage prevention program (or recording prevention program) can be operated.

The launching module can be automatically downloaded to the client 1000 through an object tag on a web page provided from a web server. The launching module can be installed in the form of an ActiveX Control, but is not limited to this.

When the user requests sending of contents through the web page, the launching module may operate the storage prevention program, and identify a version of the storage prevention program thereby to update (or automatically update) to a recent version.

The client 1000 and the contents server 600 are connected to each other via the communication network 500, and the communication network 500 includes not only the Internet but also a mobile communication network.

Here, the Internet includes all the worldwide open networks that provide TCP/IP(Transmission Control Protocol/Internet Protocol) protocol and many services on an upper layer of the TCP/IP, i.e., HTTP(Hyper Text Transfer Protocol), Telnet, FTP(File Transfer Protocol), DNS(Domain Name System), SMTP(Simple Mail Transfer Protocol), SNMP(Simple Network Management Protocol), NFS(Network File Service), etc.

The mobile communication network comprises a BS (Base Station), an MSC (Mobile Switching Center), and an HLR (Home Location Register), an Access Gateway through which wireless packet data is transmitted and received, a PDSN(Packet Data Serving Node), etc.

The contents server 600 sends, to the client 1000, contents requested by a user.

The contents server 600 may be connected to a database for storing contents or user information, etc.

Figure 2:
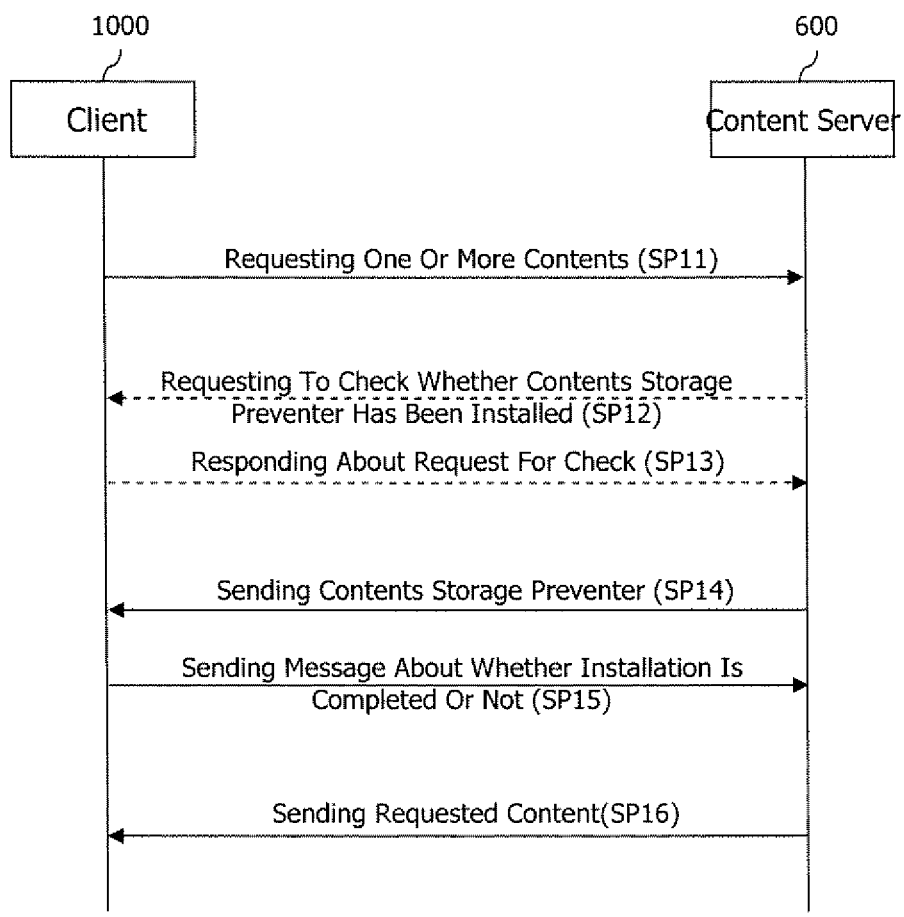
FIG. 2 is a signal flow chart showing a communication process between a client and a contents server according to an exemplary embodiment.

FIG. 2 is a signal flow chart showing one communication process between a client and a contents server according to the present invention.

As shown, the client 1000 requests sending of specific contents to the contents server 600 via the communication network 500 (SP11).

Once receiving a request for the specific contents from the client 1000, the contents server 600 requests the client 1000 to identify a contents storage preventer, i.e., a storage prevention (recording prevention) software program for preventing the contents from being stored in the client 1000 except for being buffered has been installed (SP12). Here, the storage prevention may be performed by locking a buffer for temporarily storing the contents, and thereby preventing access to the buffer by a program for storing contents, or hiding an address of the buffer. The storage prevention may also be performed by methods described in certain embodiments that will be explained later.

Once receiving from the client 1000 a response that the contents storage preventer, i.e., the storage prevention software program has not been installed (SP13), the contents server 600 sends the storage prevention software program to the client 1000 (SP14).

After receiving the contents storage preventer, i.e., the storage prevention software program sent from the contents server 600, the client 1000 installs it. Here, the received storage protection software program may be installed in the form of an ActiveX Control. When the storage prevention software program has been completely installed, a message that the installation of the storage prevention software program has been completed (or a response message about installation completion) is sent to the contents server 600 (SP15).

Then, the contents server 600 sends the requested contents to the client 1000 in response to the message that the installation of the storage prevention software program has been completed (SP16).

So far, it was explained that the contents storage preventer, i.e., the storage prevention software program was sent from the contents server 600. However, the contents storage preventer, i.e., the storage prevention software program may be sent from another server, e.g., a software distribution server (or other network entity).

Figure 3:
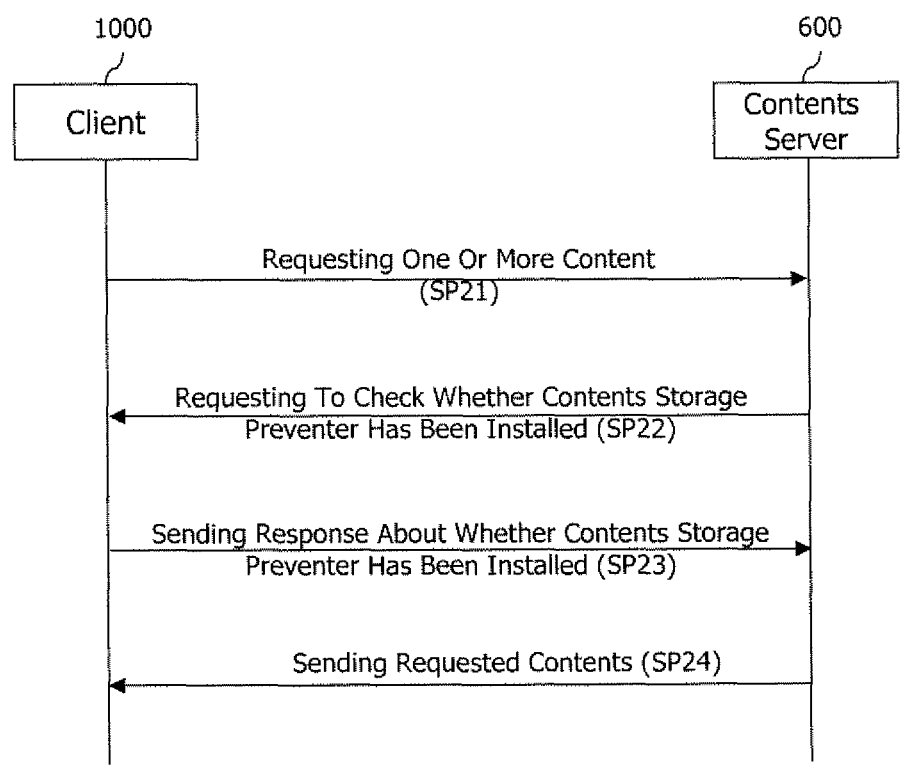
FIG. 3 is a signal flow chart showing another communication process between a client and a contents server according to an exemplary embodiment.

FIG. 3 is a signal flow chart showing another communication process between a client and a contents server according to the present invention.

As shown, the client 1000 requests sending of specific contents to the contents server 600 via the communication network 500 (SP21).

Once receiving a request for the specific contents from the client 1000, the contents server 600 sends, to the client 1000, a check request message about whether a contents storage preventer, i.e., a storage prevention software program for preventing the requested contents from being stored in the client 1000 except for being buffered has been installed in the client (SP22).

In response to the check request message, the client 1000 sends to the contents server 600 information about whether the contents storage preventer, i.e., the storage prevention software program has been installed in the client 1000 (SP23).

Based on the received information, the contents server 600 may send the requested contents to the client 1000, or may send the contents storage preventer, i.e., the storage prevention software program to the client 1000 thereby to allow the contents storage preventer, i.e., the storage prevention software program to be installed or activated.

That is, when it is determined that the contents storage preventer, i.e., the storage prevention software program has been installed (or activated) in the client 1000, the contents server 600 sends the requested contents to the client 1000 (SP24).

On the contrary, when it is determined that the contents storage preventer, i.e., the storage prevention software program has not been installed (or activated) in the client 1000, the contents server 600 sends the contents storage preventer, i.e., the storage prevention software program to the client 1000 such as the step of the SP14 of FIG. 2. After the contents storage preventer, i.e., the storage prevention software program is installed, the contents server 600 sends the requested contents to the client 1000.

As aforementioned, the concept about the contents storage preventer, i.e., the storage prevention software program disclosed in FIG. 2 or 3 (or a storage preventer, or recording prevention software program) will be commonly applied to the first to third embodiments of the present invention that will be later explained.

FIG. 4 is a detailed block diagram of the client of FIG. 1 according to a first embodiment of the present invention;

As shown, the client 1100 that can prevent contents from being stored (or recorded, etc.) may comprise a storage preventer 1110, application software programs 1120, a process monitoring driver 1130, and a kernel 1140.

The application software programs 1120 are for performing various functions and installed at the client 1000. Among these application software programs, it is known that there is a malicious program (or codes, or library) for storing contents to be received from contents server without any authority.

The kernel 1140 is the most important core of an operating system of a computer such as the client 1000, and provides basic service to all the parts of the operating system. The storage preventer 1110 prevents contents to be received from being stored by the program.

In order to so, the storage preventer 1110 can first try to find out the malicious program. The storage preventer is capable of checking all processes resource to find out the malicious program.

But, in order to minimize a processing amount for a processor, in the preferred embodiment of the present invention, a specific event can be preset to be occurred whenever the application software programs 1120 is operated or stopped (or activated or deactivated), so that process resource can be checked only when the preset event occurs. The preset event may be a signal indicating execution or ending of the malicious program (or codes, or library) for storing contents.

The process monitoring driver 1130 monitors process resource in the client 1000. And then, the process monitoring driver 1130 transmits information out the process resource through the kernel 1140 to the storage preventer 1110 so that the storage preventer 1110 can prevent the content, e.g., image, video from being stored, by analyzing the received process resource information. Such the process monitoring driver 1130 can be installed with the storage preventer 1110 or installed by the storage preventer 1110 in the client 1000.

The storage preventer 1110 may be a program. The storage preventer 1110 may be received through the communication network 500, or may be installed at the client 1000 by using an additional storage medium.

When a preset specific event occurs according to the application software programs 1120, the process monitoring driver 1130 reads process resource information of the application software programs 1120, and sends the read information to the storage preventer 1110.

Detailed configurations and functions of the storage preventer 1110 will be explained in more detail with reference to FIG. 5.

In FIG. 4, the storage preventer 1110 for preventing contents from being stored is included in the client 1000. However, the storage preventer 1110 may be implemented as an additional device thereby to prevent contents from being stored in the client 1000.

Hereinafter, a method for installing the process monitoring driver 1130, and a configuration of the storage preventer 1110 will be explained in more detail with reference to FIG. 5.

Figure 5:
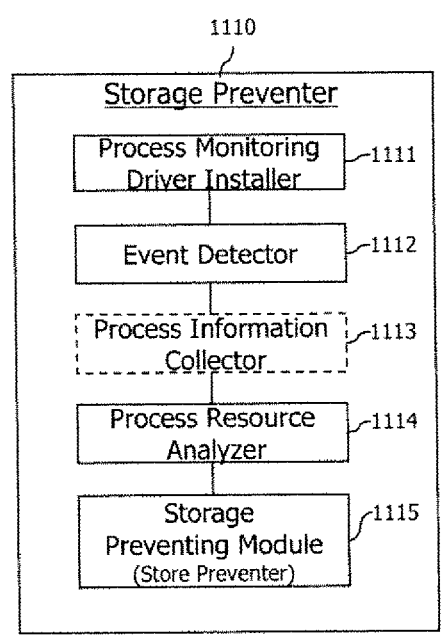
FIG. 5 is a detailed block diagram of a storage preventer of FIG. 4 according to an exemplary embodiment.

FIG. 5 is a detailed block diagram of a storage preventer of FIG. 4 according to the present invention.

As shown, the storage preventer 1110 may include a process monitoring driver installer 1111 an event detector 1112, a process resource analyzer 1114, and a storage preventing module 1115 (or a storage prevention device or element).

The process monitoring driver installer 1111 allows the process monitoring driver 1130, which is connected to the application software programs 1120 and monitors process resources related to the application software programs 1120, to be installed through the kernel 1140.

The event detector 1112 monitors whether a specific event occurs or not, and receives process resource information from the process monitoring driver 1130 when an occurrence of the specific event is detected.

Meanwhile, the event detector 1112 can not receive process resource information, but receive information about whether a process has been performed or not and an ID of the performed process from the process monitoring driver 1130.

In such a case, it may be better that the process information collector 1113 may be included in the storage preventer 1110. Also, in this case, the process information collector 1113 may collect the process resource information by using the process ID received from the event detector 1112.

The process resource analyzer 1114 analyzes the process resource information collected from the event detector 1112 or the process information collector 1113. The analyzing of process resource is to analyze a routine, i.e., codes of the process resource received through the event detector 1112 or the process information collector 1113.

The storage preventing module 1115 prevent contents, e.g., image from being stored (or recorded), if it is determined that the process resource has a malicious routine (or codes) relating to an unauthorized storage as the result of the analysis by the process resource analyzer 1114.

As aforementioned, as the method for preventing contents from being stored, may be used various methods, such as a method for stopping a process including codes relating to an unauthorized storage, a method for stopping a specific program for reproducing contents among the application software programs 1120, or a method for preventing contents from being outputted to a user interface (UI).

Hereinafter, the storage preventer 1110 according to the present invention will be explained with examples.

It is assumed that video data being currently reproduced in the client 1000 is to be stored by using a program which can be used by a malicious person, for example, 'WmRecorder'.

Also, it is assumed that a specific event occurs according to the application software programs 1120, i.e. according to operation and end of the application software programs 1120.

Therefore, if the specific event occurs, the process monitoring driver 1130 sends process resource information of the corresponding application software programs 1120 to the storage preventer 1110.

For instance, when a program, 'WmRecorder' used to store video is operated, the process monitoring driver 1130 sends process resource information of the 'WmRecorder' to the storage preventer 1110.

In the case that codes relating to the storage (or recording) are included in process resource of the 'WmRecorder', the storage preventer 1110 prevents the video from being stored or recorded.

The method for preventing contents from being stored may use various techniques such as a method for stopping a process, 'WmRecorder.EXE', a method for automatically stopping the application program that reproduces contents, or a method for preventing contents from being outputted to a user interface (UI).

In FIG. 5, the storage preventer 1110 was regarded as a program installed at the client 1000 so as to prevent contents from being stored. However, the storage preventer 1110 may be implemented as an additional device including its own function. In this case, the process monitoring driver installer 1111 may not be a component of the storage preventer 1110.

Figure 6:
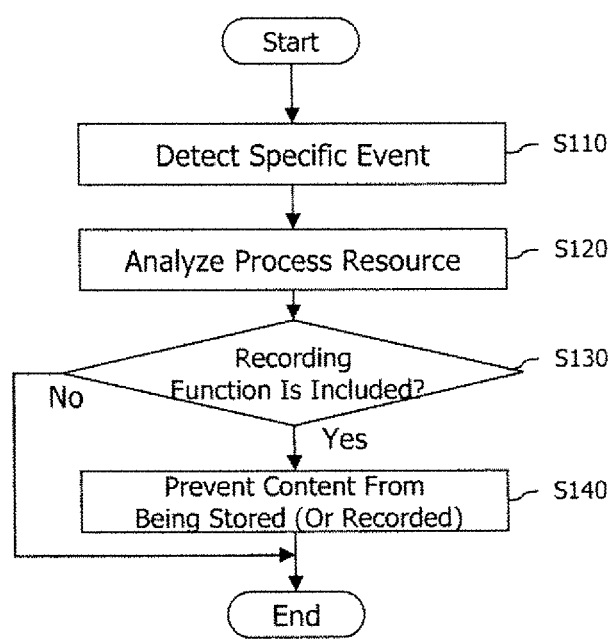
FIG. 6 is a flowchart showing a method for preventing storage of contents according to an exemplary embodiment.

FIG. 6 is a flowchart showing a method for preventing storage of contents according to a first embodiment of the present invention.

The method for preventing contents from being stored according to the present invention is implemented in an assumption that the storage preventer 1110 is installed in the client 1000, and the process monitoring driver 130 is also installed in the client 1000.

According to the method for preventing storage of contents according to the present invention, when the application software programs 1120 is currently operated in the client 1000, a specific event of the application software programs 1120 is detected.

As aforementioned, the specific event may indicates an execution or ending of the application software programs 1120.

In the case that process resource is identified only when the specific event occurs, a load of a CPU of the client 1000 can be reduced (S110).

When receiving process resource from the process monitoring driver 1130, the process resource analyzer 1114 analyzes the received process resource information (S120).

During the analysis, whether a malicious routine (or codes) relating to a storage function (or recording function) is included in the process resource is determined (S130).

If it is determined that the malicious routine is included in the process resource, contents are prevented from being stored (S140).

As a method for preventing contents from being stored, a process that performs a storage function may be stopped, or the application software programs 1120 that reproduces contents may be stopped.

As a method for preventing contents from being stored, a user interface (UI) is made not to output a screen for reproducing the contents, rather, made to output another screen, e.g., a screen informing that a storage prevention function is being executed, etc. may be output.

Figure 7:
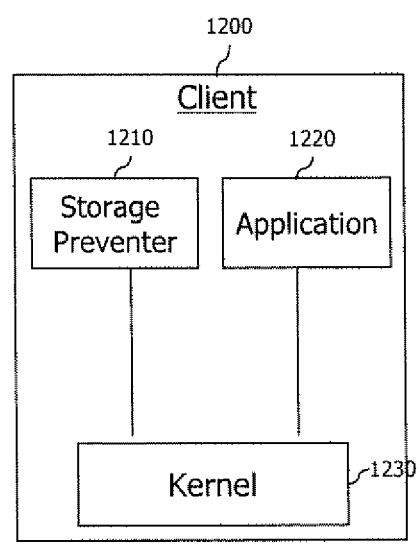
FIG. 7 is a detailed block diagram of the client of FIG. 1 according to another exemplary embodiment.
Figure 8:
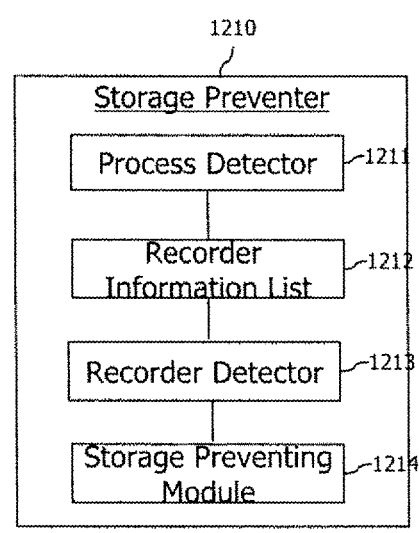
FIG. 8 is a block diagram of a storage preventer of FIG. 7 according to an exemplary embodiment.

FIG. 7 is a detailed block diagram of the client of FIG. 1 according to a second embodiment of the present invention, and FIG. 8 is a block diagram of a storage preventer of FIG. 7 according to the present invention.

In a similar manner as FIG. 4, the client 1200 may include a storage preventer 1210, an application 1220, and a kernel

1230. The application 1220 and the kernel 1230 will be explained by referring to FIG. 4.

In FIG. 7, the storage preventer 1210 for preventing contents from being stored is included in the client 1200. However, the storage preventer 1210 may be implemented as an additional device.

The storage preventer 1210 includes a process detector 1211, a recorder information list 1212, a recorder detector 1213, and a storage preventing module 1214.

The process detector 1211 detects a process being currently processed in the client 1200.

As aforementioned, the process detection may be performed not by analyzing up to a routine, or codes being processed, but by detecting only a title of a process being currently executed or activated.

For instance, in a computer, Microsoft Windows™ operating system most widely used, a list of processes being currently performed by a CPU of a computer can be detected by a task manager.

But, even if a process, for example 'WmRecorde.exe' is detected, it is difficult to precisely determine only by the name of the process whether or not the process has a storing function (or recording function).

Accordingly, in the first embodiment of the present invention, if it is determined by identifying the process resource of the 'WmRecorder.exe' that codes relating to a storing function (or, recording function) are included in the process resource, contents, for example video (or image) can be prevented from being stored or recorded.

On the contrary, in second embodiment of the present invention, the process detector 1211 is configured to detect the name of the process (i.e., WmRecorder.exe) or related information (for example, version information, company name, and the like) of the process without identifying process resources. Accordingly, an amount of a load to be processed by a process such as a CPU of the client 1000 so as to prevent storing or recording can be reduced.

The recorder information list 1212 includes information about a program (or recorder) capable of storing or recoding the contents, or various capture programs capable of capturing images.

The recorder information list 1212 may be stored in a storage means of the client 1200, e.g., a memory or a hard disk.

The recorder detector 1213 determines whether there exists a process matched with recorder information of the recorder information list 1212 among processes detected by the process detector 1211.

When recorder information is detected by the recorder detector 1213, the storage preventing module 1214 prevents contents from being stored (or prevents recording).

It is noted that the method for preventing contents from being stored as aforementioned, may use various techniques, such as a method for stopping a process, a method for automatically stopping the application that reproduces contents, or a method for preventing contents from being outputted to a user interface (UI).

Hereinafter, the method for preventing contents from being stored according to the present invention will be explained in more details.

It is assumed that contents such as video being currently reproduced are to be stored in the client 1000 by using a program, 'WmRecorder' most widely used to video-record the video.

In the first embodiment of the present invention, when it is determined by the process resource analyzer 1114 that malicious codes relating to a storage function are included in a process being executed, the process ('WmRecorder') is made not be operated, or contents such as video is prevented from being stored (or recorded).

In the second embodiment of the present invention, when a recorder such as 'WmRecorder.EXE' is pre-stored in the recorder information list 1212, the process detector 1211 detects the 'WmRecorder.EXE'. Then, if it is certified by the recorder detector 1213 that the 'WmRecorder.EXE' detected by the process detector 1211 is included in the recorder list 1212, contents are prevented from being stored by the storage preventing module 1214.

It is noted that the method for preventing contents from being stored, may use various techniques, such as a method for stopping a process ('WmRecorder. EXE'), a method for automatically stopping the application that reproduces contents, or a method for preventing contents from being outputted to a user interface (UI).

It is also possible to install the application software programs 1120 for reproducing contents, such as a video player at the client 1000 with including a function to prevent contents from being stored.

Hereinafter, a process for preventing contents from being stored according to the present invention will be explained in sequence.

Figure 9:
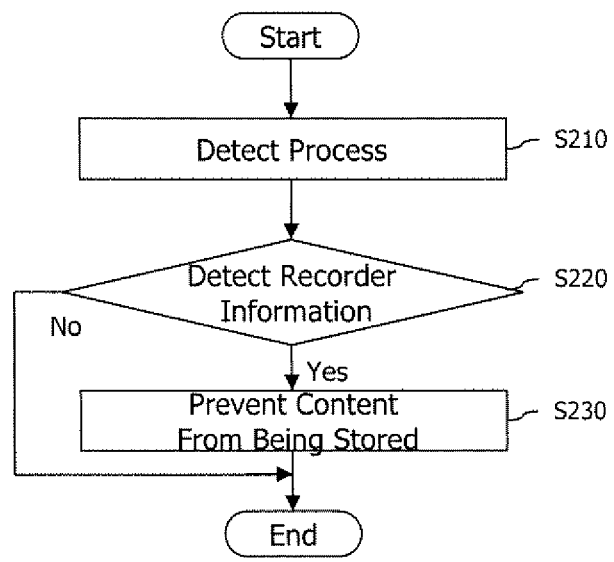
FIG. 9 is a flowchart showing a method for preventing storage of contents according to another exemplary embodiment.

FIG. 9 is a flowchart showing a method for preventing storage of contents according to a second embodiment of the present invention. Firstly, a process being currently processed (or executed) in the client 1000 is detected.

As aforementioned, the process detection is to detect a name of a task being currently processed a CPU, rather than to analyze up to a routine, i.e., a series of codes.

As a method for detecting a process, a process may be detected per a preset time, a detecting method performed in the client 1000 may be detected only when a specific program for reproducing contents is operated, etc. (S210).

Then, by comparing the detected process with preset recorder information on a recorder information list, it is determined whether a process being currently processed in the client 1000 matches with the preset recorder information (S220).

The recorder information includes information about a recording program, or a capture program, or a data storage program.

It is also possible to receive the recorder information from a server connected to the client 1000 through the communication network 500, such as the contents server 600 or an information management server (or management server), and to prevent contents from being stored (or recorded) in the client 1000 by using the received recorder information.

By using the recorder information provided through the communication network 500, various recorder information may be received, and may be easily updated. Accordingly, the method for preventing contents from being stored by using only recorder information according to the present invention may be implemented more effectively.

When information on a process being currently executed in the client 1000 matches with it on the recorder information list, contents are prevented from being stored or recorded.

As aforementioned, as a method for preventing contents from being stored, a process that is matched with the preset recorder information may be stopped, or the application that reproduces contents may be stopped. Also, a user interface (UI) is made not to be output a screen for reproducing the contents, rather to output another screen, e.g., a screen informing that a storage (recording) prevention function is being executed, etc. may be output (S230).

Figure 10:
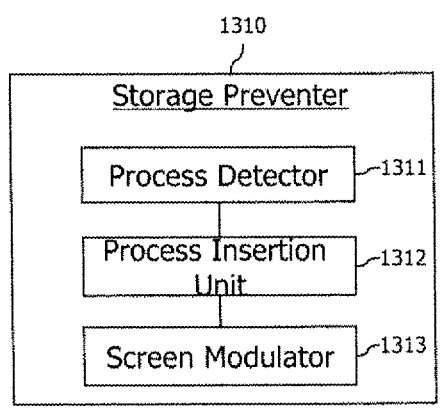
FIG. 10 is a view showing a storage preventer according to a further exemplary embodiment.

FIG. 10 is a view showing a storage preventer according to a third embodiment of the present invention.

Referring to FIG. 10, it will be explained a device and method for preventing contents from being stored by inserting a screen modulation module (or screen change module) into a process including a storage function, when process resource including a storage function is detected.

The method may include a method for calling a LoadLibrary function of a storage program of contents by using a thread such as CreateRemote Thread.

More concretely, a screen modulation module (or screen change module) is inserted into the process including a storage function by opening or connecting to a process relating to storage (or recording).

Once the screen modulation module (or screen change module) is inserted into the process including a storage function, a function pointer of a recorder such as a storage program is replaced by a function pointer for storage prevention.

The replacement between function pointers may be performed by using an Image Address Table (IAT).

In this manner, a screen modulation (or screen change) is performed so that another screen such as a black screen, or a screen indicating that a storage prevention function is being performed or indicating that the storage is unauthorized is output onto a screen that is stored by a storage program.

The configuration of the storage preventer for preventing contents from being stored will be explained with reference to FIG. 10.

As shown, the storage preventer 1310 according to a third embodiment of the present invention may include a process detector 1311, a process insertion unit 1312, and a screen modulator 1313. Here, the storage preventer 1310 of FIG. 10 is another form of the storage preventer 1210 of the client 1200 shown in FIG. 7. However, the storage preventer 1310 may not be included in the client 1200, but may be implemented as an additional device.

The process detector 1311 monitors a process being currently processed in the client 1200, thereby determining whether a process relating to storage of contents exists among detected processes.

As the method for determining whether a process being currently processed in the client 1200 is a process relating to storage of contents, there may be method for determining whether a storage-related function is included in corresponding code information by using code information such as routine information of process resource. Also, there may be a method for determining whether a library relating to storage of contents is being executed.

In this case, as aforementioned, in order to minimize a processing amount for a processor, process resource may be identified only when a preset event occurs.

In order to reduce a load of a CPU of the client 1200, it may be also possible to detect a storage-related process based on information in the recorder information list, for example version information, copyrights, a company name as well as a name of a process being processed.

In this case, a storage-related process can be identified without identifying routine information of a process.

Name information of recorder information may include a company name, file description, a version, an internal name, a legal copyright, an original name, a product name, a product version, comments and legal trademarks.

The method for detecting a process may be implemented in various manners.

When a process relating to storage of contents is detected, the process insertion unit 1312 connects to or opens the process including the storage function to insert a screen modulation module therein.

The method for inserting a screen modulation module (or screen change module) into the process including the storage function, may use a method for calling a LoadLibrary function of a storage program of contents by using a thread such as CreateRemote Thread.

The screen modulator 1313 includes a screen modulation module which is to be inserted into a storage-related process. Once the screen modulation module is inserted into the storage-related process, performed is screen modulation such as another screen, e.g, a black screen, or a screen indicating that a storage prevention function is being performed or indicating that the storage is unauthorized is output onto a screen that is stored by the storage program (recorder).

As the screen modulation, a function pointer of a storage program is replaced by a function pointer for storage prevention (or recording prevention). The replacement between function pointers may be performed by using an Image Address Table (IAT).

For replacement between function pointers, a screen modulation module including a function pointer for storage prevention may be temporarily stored in a storage means of the client 1000, e.g., a memory.

In this manner, a screen modulation is performed so that another screen such as a black screen, or a screen indicating that a storage prevention function is being performed or that the storage is unauthorized is output onto a screen that is stored by a storage program, the recorder installed at the client 1000. Accordingly, contents are prevented from being stored.

Furthermore, since a screen itself inserted into a process and output from the recorder is modulated, even if storage programs for storing contents defend them from being ended or stopped, contents are prevented from being stored.

Figure 11:
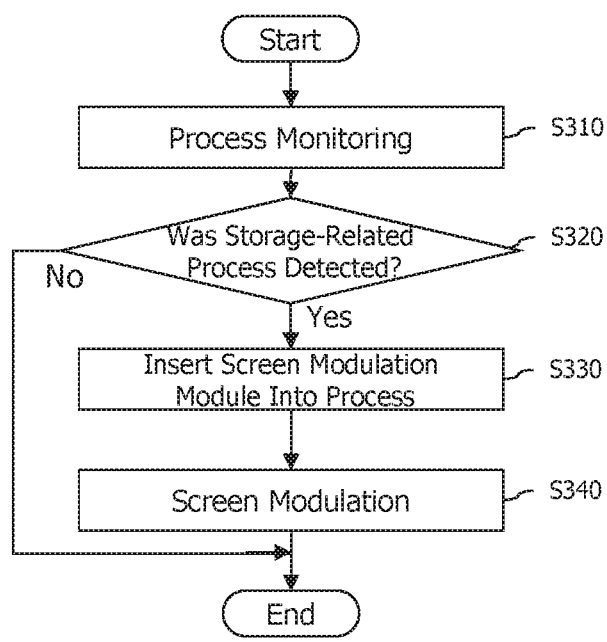
FIG. 11 is a flowchart showing a method for preventing storage of contents according to a further exemplary embodiment.

FIG. 11 is a flowchart showing a method for preventing contents from being stored according to a third embodiment of the present invention.

As shown in FIG. 11, a process being currently process in the client 1000 is detected to be monitored (S310).

Then, it is determined whether a storage-related process is detected or not (S320). When a storage-related process is detected, a screen modulation module is inserted into the storage-related process.

As aforementioned, the method for determining whether a process being currently processed in the client 1200 is a process relating to storage of contents may be performed by using code information such as routine information of process resource. Also, the method may be implemented by detecting a storage-related process by detecting information on a recorder information list, a storage program (or a recording program).

The method for inserting a screen modulation module into a storage-related process, may use a method for calling a LoadLibrary function of a storage program of contents by using a thread (S330).

Once the screen modulation module is inserted into the storage-related process, performed is screen modulation such as another screen, e.g, a black screen, or a screen indicating that a storage prevention function is being performed or that the storage is unauthorized is output onto a screen.

The screen modulation may be performed by replacing a function pointer of the storage program by a function pointer for storage prevention. The replacement between function pointers may be performed by using an Image Address Table (IAT)(S340).

The methods for preventing contents from being stored (or some of the characteristics thereof according to the first to third embodiments of the present invention may be arbitrarily combined to each other. That is, the method for preventing contents from being stored according to the first embodiment may be combined with the method for preventing contents from being stored according to the second embodiment. For instance, by detecting or monitoring a process, whether or not a storage-related process is being executed may be identified, and then whether or not a preset event occurs at an application being currently executed may be identified.

To this end, the storage preventer (or some of the characteristics thereof according to the first to third embodiments of the present invention may be also combined to each other.

Figure 12:
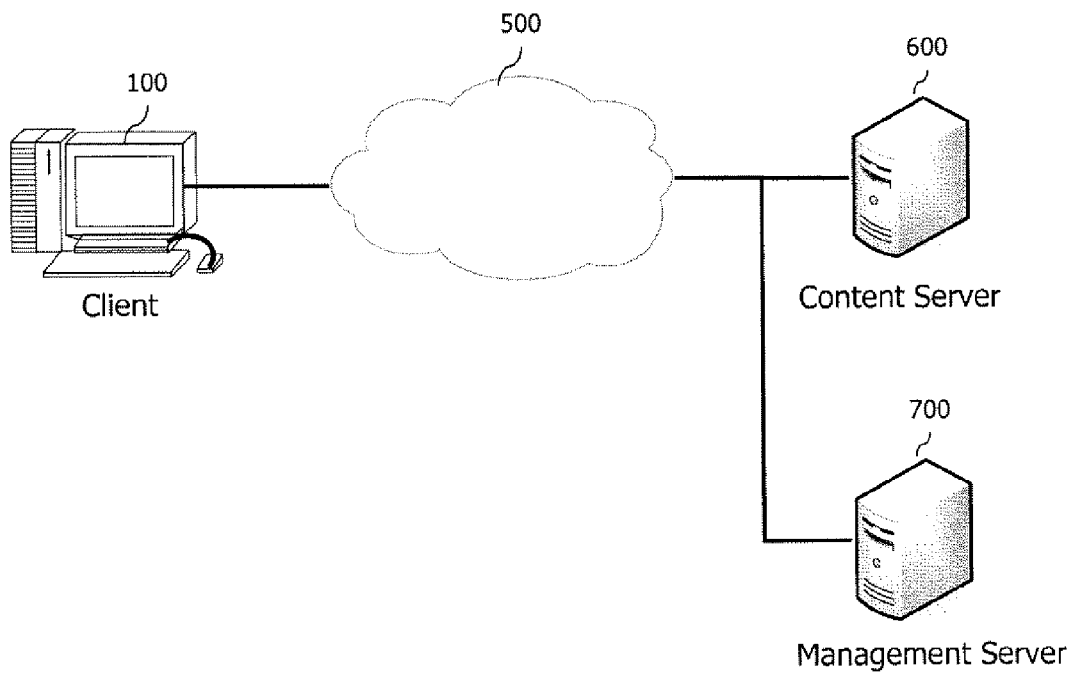
FIG. 12 is a view showing a contents providing system according to an additional exemplary embodiment.

FIG. 12 is a view showing a contents providing system according to a fourth embodiment of the present invention. As shown, the contents providing system comprises a client 1000, a contents server 600, and a management server (or information management server: 700).

As aforementioned, the client 1000 may include a web browser (or other connection function) for allowing connection to the management server 700 with the contents server 600, and the application software programs 1120 of FIG. 4 necessary to reproduce contents.

The client 1000, the contents server 600, and the management server 700 may be connected to each other through the communication network 500.

As aforementioned, the client 1000 may include a storage preventer for preventing contents from being stored. However, the storage preventer may not be smoothly operated when a new program for storing contents develops, or when a new library develops, or when a new code develops.

In order to solve these problems, when a new program for storing contents develops, or when a new library develops, or when a new code develops, the management server 700 may provide the information to the storage preventer of the client 1000.

The management server 700 may be connected to a database (or other storage medium) for storing the information, etc.

The management server 700 can provide the information to the client 1000 only when contents are sent to the client 1000 from the contents server 600.

The management server 700 may send, to the client 1000, the storage preventer installed at the client 1000.

Here, the information may be sent with the storage preventer. Or, the information may be sent to the client 1000 from other server rather than the management server 700, e.g., the contents server. The recorder information may be sent from a distribution server for sending the storage preventer.

In the preferred embodiment of the present invention, contents are sent to the client 1000 from the contents server 600, and thereby the management server 700 sends, to the client 1000, information of a recorder for storing the contents such as image. Then, the client 1000 reproduces the contents. Here, the storage preventer of the client 1000 prevents the contents from being stored by using the received recorder information.

When contents pre-stored in the client 1000, rather than the contents sent from the contents server 600, is to be reproduced at the application of the client 1000, the contents may be prevented from being stored by the storage preventer of the client 1000.

Furthermore, based on the information to the client 1000 through the communication network 500, it can be determined that the contents can be stored or should not be stored by the client 1000 according to the kind of contents, user's information, information about the client 1000, etc. provided to the client 1000.

For instance, in the case of User Created Contents (UCC) or User Generated Contents (UGC), a UCC provider can allow its UCC to be recorded. When a corresponding UCC is provided to the client 1000, recorder information is not provided from the management server 700. Accordingly, the client 1000 does not perform a function to prevent video image from being stored, and thus video image may be stored.

On the contrary, in the case that contents are always prevented from being stored, contents may be prevented from being recorded by continuously providing updated recorder information to the client 1000.

The method for preventing contents from being stored in the client 1000 may be performed by installing a storage preventer at the client 1000.

The method for preventing contents from being stored in the client 1000 may be also performed when process resource including a storage function is detected according to the first embodiment.

The method for preventing contents from being stored in the client 1000 may be also performed by using only name information of a recorder (or a storage program) according to the second embodiment, not by monitoring process resource being currently processed in the client 1000. The method may be also performed according to the third embodiment.

More concretely, the prevention of the storage of the contents may be performed by detecting a process of the client 1000 relating to storage of contents, and then by identifying whether the detected process matches with it in the received recorder information. The prevention may be performed only when the detected process matches with it in the received recorder information. Here, the process may be detected by monitoring a name and/or process resource of a program being currently executed in the client 100. Only when the monitored name and/or program resource of a program is matched with it in the received recorder information, contents are prevented from being stored.

The name information of a recorder includes various information such as version information, copyrights, and a company name as well as a name of a substantial process which can be easily obtained without analyzing routine information of the process.

When contents are prevented from being stored by monitoring process resource, the monitoring may be performed by using a process monitoring function such as PsSetCreateProcessNotifyRoutine among Driver Development Kit (DDK) functions.

In case of analysis of the process resource, a routine (or codes) of the process being currently processed should be analyzed. Accordingly, a processing amount of the client 1000 is increased.

In order to minimize a processing amount, process resource may be identified only when a preset event occurs at the client 1000.

As aforementioned, the preset event may be a signal indicating execution or ending of an application program for reproducing contents.

The method for preventing contents from being stored by the client 1000 may be variously implemented. For example, the method may be performed by forcibly ending (or stopping) a process having a storage function when the process resource having the storage function is detected, or by outputting other contents on a screen to be stored, etc.

As aforementioned, the recorder information read by the management server 700 may be provided to the client 1000. Or, the recorder information may be stored in the storage preventer of the client 1000 according to the first to third embodiments, and when contents are reproduced in the client 1000, the stored recorder information may be used to stop the reproduction or to end the storage program (recorder).

In the method for preventing contents from being stored by managing information of a recorder that stores contents through the communication network 500, and by providing the recorder information to the client 1000, contents may be stored or may be prevented from being stored according to the kind of contents sent to the client 1000, or user information of the client 1000.

The management server 700 for preventing contents from being stored in the client 1000 by using information of a recorder that stores contents will be explained with reference to FIG. 13.

Figure 13:
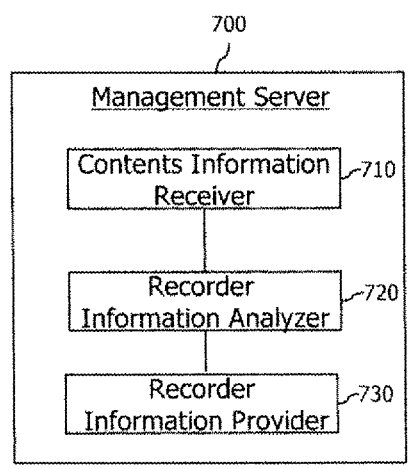
FIG. 13 is a detailed block diagram of a management server of FIG. 12 according to an exemplary embodiment.

FIG. 13 is a detailed block diagram of a management server of FIG. 12 according to the present invention.

The management server 700 of FIG. 12 is depicted as an additional device, whereas the management server 700 of FIG. 13 for preventing contents from being stored may be included in the contents server 600 or a server that sends a storage preventer for preventing storage of contents.

As shown in FIG. 13, the management server 700 may include a contents information receiver 710, a recorder information analyzer 720, and a recorder information provider 730.

The contents information receiver 710 may receive information about contents to be transmitted to the client 1000. The contents information includes information about the kind of contents, information about whether or not the contents can be stored, a user's information of the client 1000, and information of the client 1000, etc. If all contents are to be prevented from being stored regardless of the kind of contents or a user, the information could include information about all kinds of contents.

The recorder information analyzer 720 analyzes the contents information received by the contents information receiver 710 and then generates recorder information. The recorder information indicates a storing program (or a recording program) for storing (or recording) specific contents.

The recorder information analyzer 720 can generate the recorder information based on a database (or other storage medium) that stores the recorder information, and/or the database can be updated by an operator of the management server 700, etc.

As the contents information receiver 710 receives contents information from the contents server 600, the recorder information analyzer 720 can determine whether specific contents can be stored or should not be stored therein.

For instance, if a user has a proper right for allowing specific contents to be stored, the contents information receiver 710 receives contents information from the contents server 600, and then the recorder information analyzer 720 generates recorder information based on the contents information so that a storing program capable storing the specific contents can be allowed.

As another example, a user having paid a certain amount may be allowed to store some of any contents or capture image. That is, a user having paid a certain amount can store contents by an amount corresponding to the paid fee. For instance, a certain fee per one time may be charged, etc.

The recorder information provider 730 sends the recorder information to the client 1000 through the communication network 500.

Then, the recorder information sent to the client 1000 is utilized by the storage preventer installed at the client 1000, thereby preventing contents from being stored.

When recorder information pre-stored in the storage preventer installed at the client 1000 exists, the recorder information sent to the client 1000 may serve to update the recorder information pre-stored in the storage program. The updated recorder information may be stored in the client 1000.

The method for preventing contents from being stored in the client 1000 may be variously performed by monitoring process resource, by monitoring a process name, etc.

Hereinafter, a process for preventing contents from being stored according to the present invention will be explained in sequence.

Figure 14:
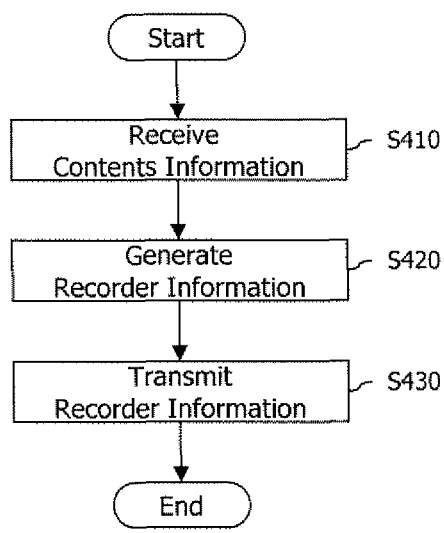
FIG. 14 is a flowchart showing a method for preventing storage of contents according to an exemplary embodiment.

FIG. 14 is a flowchart showing a method for preventing storage of contents according to a fourth embodiment of the present invention.

As shown, firstly, contents information is received from the contents server 600.

The contents information may include various information such as the kind of contents, information about whether or not corresponding contents can be stored, information about the kind of the client 1000, a user's information of the client 1000, etc. As aforementioned, by receiving the contents information from the contents server 600, the client 1000 may allow contents to be stored or allow image to be recorded (S410).

Then, recorder information is generated based on the received contents information.

Also, Information of the storage preventer installed at the client 1000 may be farther received to be used. Based on the received information of the storage preventer, the storage preventer may be updated (S420).

Then, the recorder information is sent to the client 1000. The recorder information is utilized by the storage preventer of the client 1000, thereby preventing contents from being stored.

When recorder information pre-stored in the storage preventer installed at the client 1000 exists, the recorder information sent to the client 1000 may serve to update the recorder information pre-stored in the storage preventer. The updated recorder information may be stored in the client 1000.

When recorder information pre-stored in the storage preventer installed at the client 1000 exists, a version of the pre-stored recorder information is compared with a version of recorder information sent to the client 1000. According to a result of the comparison, the pre-stored recorder information (current recorder information) may be maintained or updated.

More concretely, when a version of the pre-stored recorder information is later than that of the recorder information sent to the client 1000, the pre-stored recorder information is updated to the recorder information sent to the client 1000. Then, the updated recorder information is stored in the client 1000.

On the contrary, when a version of the pre-stored recorder information is equal to or earlier than that of the recorder information sent to the client 1000, the pre-stored recorder information is maintained as it is (S430).

Figure 15:
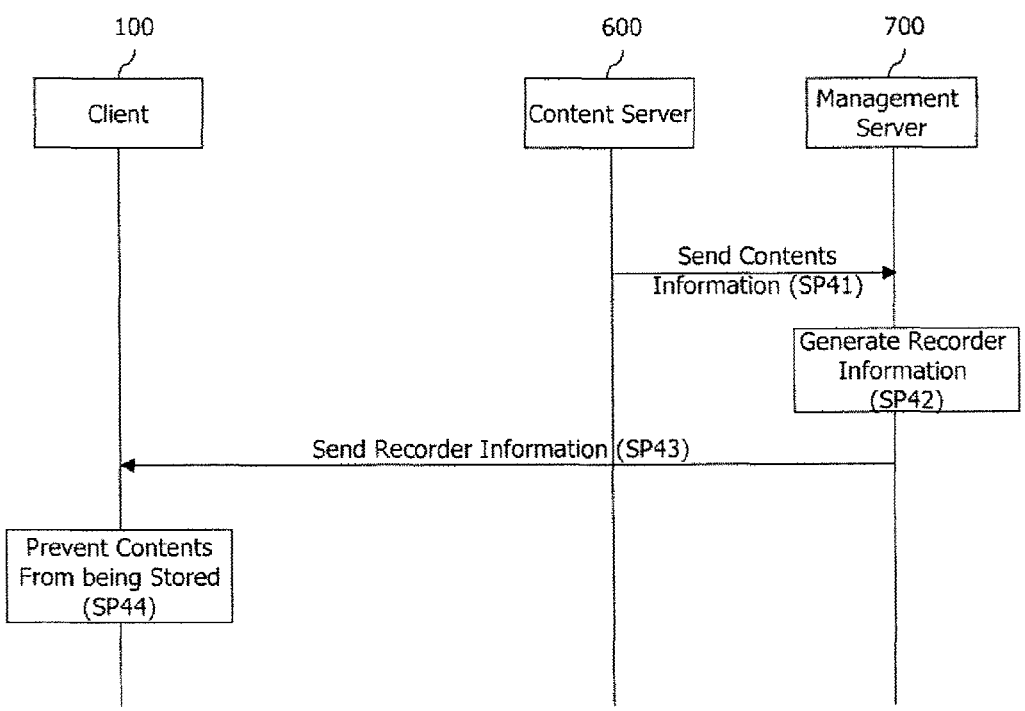
FIG. 15 is a signal flowchart showing a process for preventing storage of contents according to an exemplary embodiment.

FIG. 15 is a signal flowchart showing a process for preventing storage of contents according to a fourth embodiment of the present invention.

As shown, the management server 700 receives contents information from the contents server 600 (SP41).

Then, the management server 700 generates recorder information based on the received contents information (SP42), and sends the generated recorder information to the client 1000 (SP43).

Then, the client 1000 prevents the contents from being stored based on the recorder information (SP44).

Figure 16:
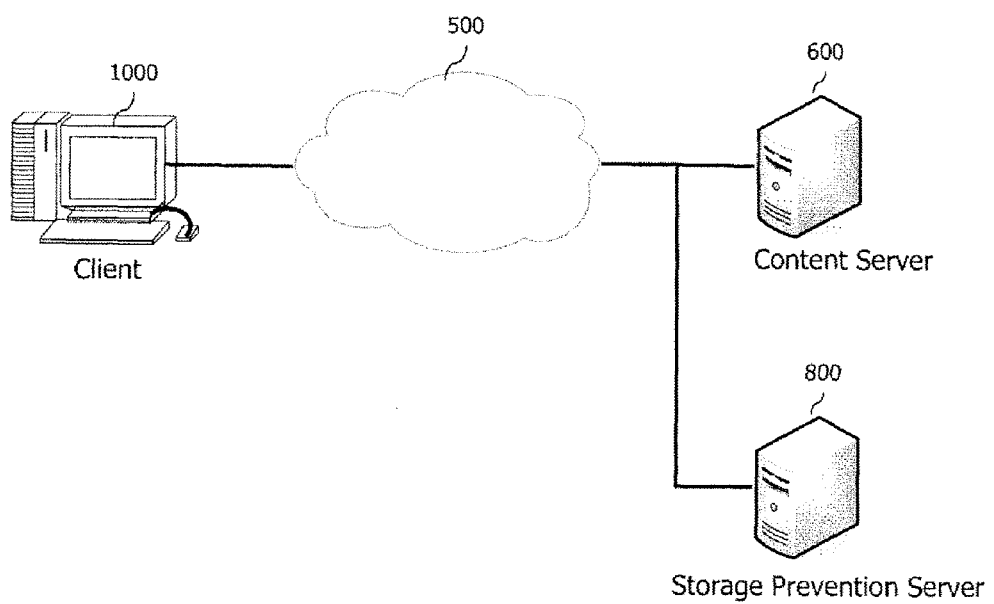
FIG. 16 is a view showing a contents providing system according to yet another exemplary embodiment.

FIG. 16 is a view showing contents providing system according to a fifth embodiment of the present invention. As shown, the contents providing system comprises a client 1000, a contents server 600, and a storage prevention server (or recording prevention/deter server) 800.

The client 1000 may include a web browser (or other connection function) for allowing connection to the storage prevention server 800 with the contents server 600, and an application necessary to reproduce contents.

The client 1000, the contents server 600, and the storage prevention server 800 are connected to each other through the communication network 500.

The storage prevention server 800 receives, from the client 1000, information of a program being executed at the client 1000, and determines whether the received program information is matched with it in preset program information. The program information received from the client 1000 may include at least one of program name information, copyright information, and program authentication information, etc.

If it is determined that the received information of the program is matched with it in the preset program information, the storage prevention server 800 determines that the program being executed in the client 1000 is allowable. Accordingly, the storage prevention server 800 allows the contents server 600 to send the contents to the client 1000.

On the contrary, if the received program information is not matched with it in the preset program information, the storage prevention server 800 sends a signal to the contents server 600 so that contents can be prevented from being sent from the contents server 600.

By using the information of a program being executed in the client 1000, especially, a reproduction program, even when the storage preventer is not installed at the client 1000, the contents are prevented from being stored (or image is prevented from being recorded).

The storage prevention server 800 may be connected to a database (or other storage medium) that stores reproduction program information or storage program information (or recording program information).

The method for preventing contents from being sent to the client 1000 from the contents server 600 may be implemented in various manners.

Contents requested from the client 1000 may be prevented from being sent to the client 1000 by following methods. First, sending of contents is stopped. Second, a screen indicating that sending of contents is stopped is displayed on a reproduction program at the client 1000. Or, advertisement data (or any data) irrelevant to requested contents is sent to the client 1000 from the contents server 600. Accordingly, contents are prevented (deterred) from being stored.

Contents can be prevented from being provided to the client 1000 by a redirection method. According to the redirection manner, when contents received from the contents server 600 is to be reproduced, an address to which a reproduction program for the contents is connected is provided in the form of another address. However, the method for preventing contents from being sent to the client 1000 is not limited to the redirection method.

Figure 17:
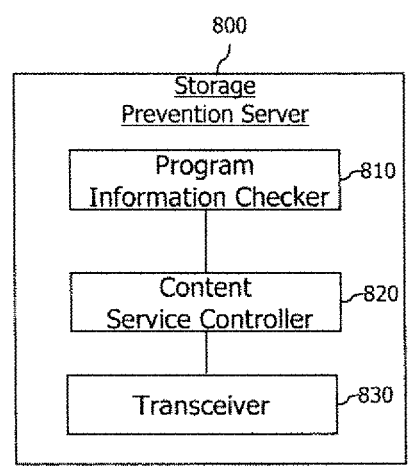
FIG. 17 is a detailed block diagram of a storage prevention server of FIG. 16.

With reference to FIG. 17, will be explained a configuration of the storage prevention server 800 for preventing contents from being stored by preventing contents from being sent to the client 1000 form the contents server 600 by using information of a program being executed in the client 1000.

FIG. 17 is a detailed block diagram of a storage prevention server of FIG. 16 according to the present invention.

In FIG. 17, the storage prevention server 800 of FIG. 17 is implemented as an additional device. However, the storage prevention server 800 for preventing contents from being stored may be included in the contents server 600 that sends contents.

As shown, the storage prevention server 800 for preventing contents from being stored according to the present invention may include a program information checker 810, a contents service controller 820, and a transceiver 830.

The transceiver 830 receives, from the client 1000, program information about a contents reproducing program being executed in the client 1000, and sends, to the contents server 600, a signal for preventing sending of contents (or another indication) according to the contents service controller 820.

The transceiver 830 may further receive information about other programs being executed in the client 1000.

The program information checker 810 check whether the contents reproducing program checked by the received program information is matched with it in preset program information, thereby to determine whether the contents reproducing program is allowable.

Alternatively, the program information checker 810 may check whether the other programs checked by the received program information are matched with them in received program information, thereby to determine whether the programs are capable of storing contents.

If the contents reproducing program or the other programs checked by the program information checker 810 are not matched with it in the preset program information, the contents service controller 820 generates a control signal to prevent sending of contents, and sends it to the contents server 600 through the transceiver 830.

However, if the contents reproducing program or the other programs checked by the program information checker 810 are matched with it in the preset storage program information, a control signal to prevent sending of contents can be generated to be sent to the contents server 600 through the transceiver 830.

Once the signal for preventing sending of contents is sent to the contents server 600, the contents server 600 stops sending of contents, or changes a Uniform Resource Locator (URL), an address to which contents are provided, etc. Accordingly, contents are prevented from being sent to the client 1000, thereby preventing contents from being reproduced in the client 1000.

Figure 18:
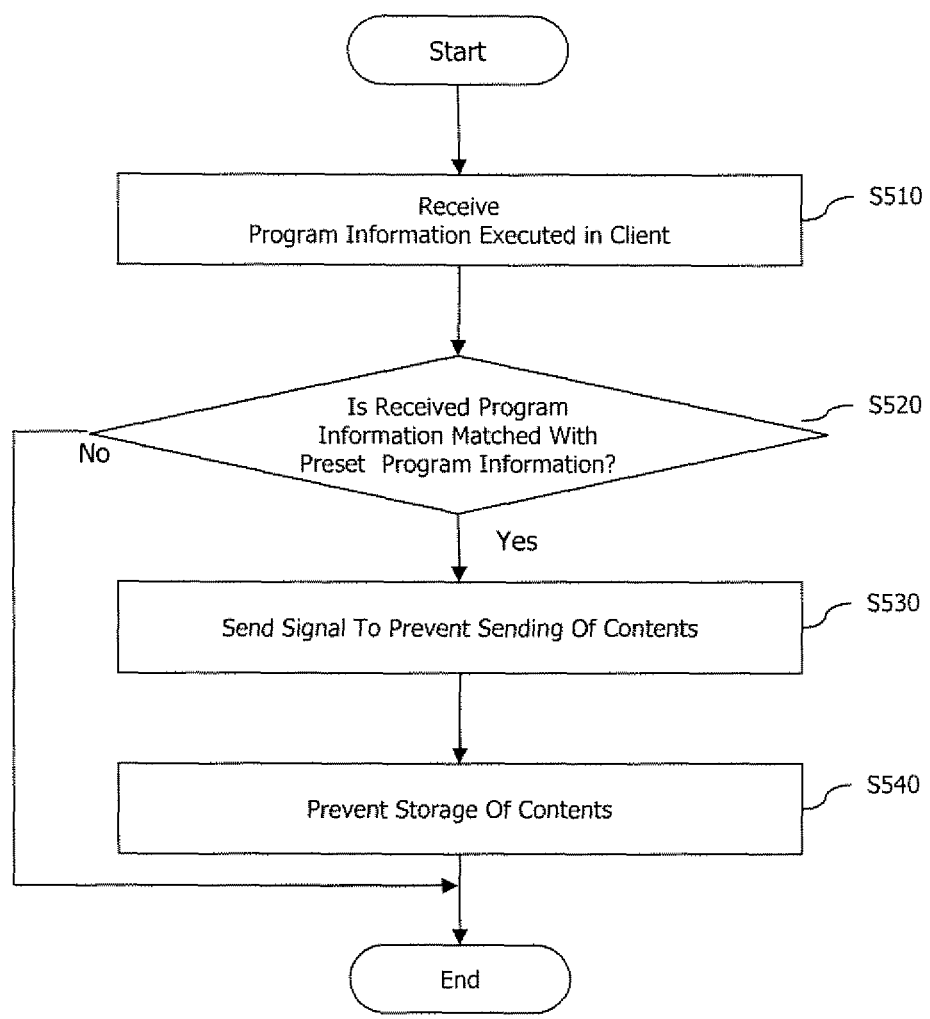
FIG. 18 is a flowchart showing a method for preventing storage of contents according to yet another exemplary embodiment.

FIG. 18 is a flowchart showing a method for preventing storage of contents according to a fifth embodiment of the present invention.

As shown, firstly, program information about a contents reproducing program being executed in the client 1000 is received from the client 1000 (S510).

Alternatively, program information about other programs being executed in the client 1000 may received. But, by receiving program information about only a reproduction program being executed, an amount of the information provided from the client 1000 is reduced, and an amount of traffic of a communication network is reduced. Furthermore, if a contents reproducing program such as a video player has a function for storing the contents, the contents reproducing program can be interfered so that the contents can be prevented from being stored according to the method.

On the contrary, by receiving the program information about all programs executed in the client 1000, even when there is a program capable of storing the contents among the all program, or when a contents reproduction program is separately performed from a program capable of storing the contents, the contents can be prevented from being stored.

When information about the contents reproduction program is received from the client 1000, it is determined that the contents reproducing program is matched with it in preset information about a contents reproduction program (S520). If they are not matched to each other, a signal (or other indication) to prevent contents from being sent is sent to the contents server 600 (S530).

Once the signal for preventing sending of contents is sent to the contents server 600, the contents server 600 stops sending of contents, or changes a Uniform Resource Locator (URL), an address to which contents are provided, etc. Accordingly, contents are prevented from being sent to the client 1000, thereby preventing contents from being stored in the client 1000.

Figure 19:
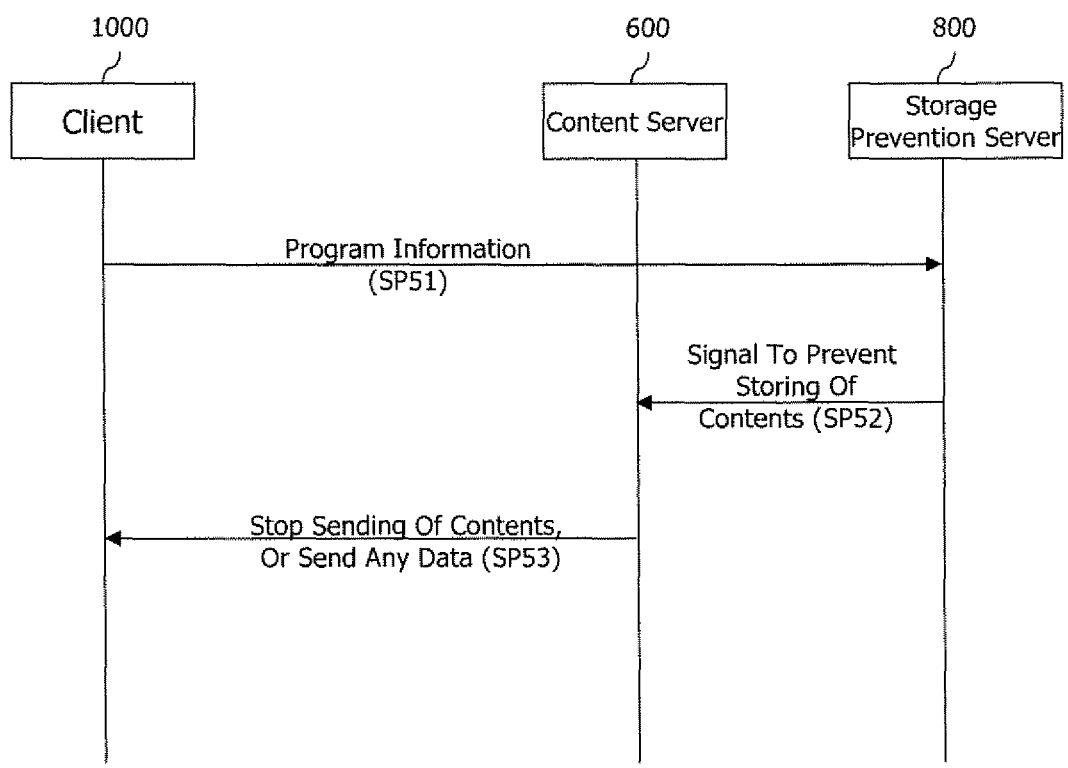
FIG. 19 is a signal flowchart showing a process for preventing storage of contents according to yet another exemplary embodiment.

FIG. 19 is a signal flowchart showing a process for preventing storage of contents according to a fifth embodiment of the present invention.

As shown, the storage prevention server 800 receives, from the client 1000, program information about a contents reproducing program being operated in the client 1000 (SP51).

Then, the storage prevention server 800 determines whether the contents reproducing program in the program information is matched with it in preset program information. If they are not matched with each other, a signal (or other indication) to prevent contents from being stored is generated, and then is sent to the contents server 600 (SP52).

Then, according to the signal sent from the storage prevention server 800 so as to prevent contents from being sent, the contents server 600 prevents contents from being sent, or send any data different from the requested contents to the client 1000, or changes an address to which the requested contents are provided. Accordingly, the client 1000 can not receive contents requested from itself, and thus contents are prevented from being stored (SP53).

The methods according to the preferred embodiments of the present invention may be implemented in the form of programs, thereby being stored in a recording medium (CD-ROM, RAM, ROM, floppy disk, hard disk, optical magnetic disk, etc.).

Figure 20:
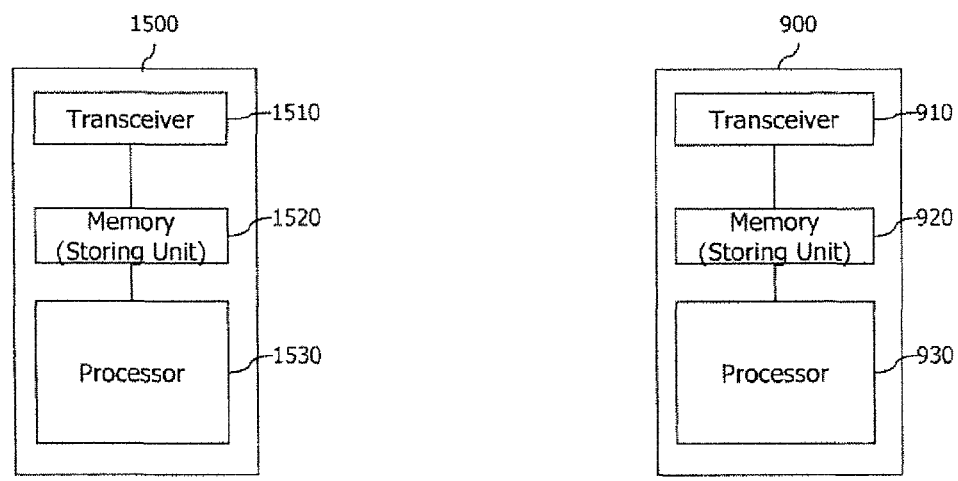
FIG. 20 is a view of a storage prevention client and a storage prevention server according to another exemplary embodiment.

FIG. 20 is a view of a storage prevention client and a storage prevention server according to a sixth embodiment of the present invention.

As shown, a client 1500 for preventing storage of contents according to a sixth embodiment of the present invention may include a transceiver 1510, a memory 1520, and a Central Process Unit (CPU) 1530.

The transceiver 1510 receives, from the contents server 600, contents through the communication network 500. Also, the transceiver 1510 further receives information about a program, a resource, a code, and a library to be executed in the client 1500 for storing the received contents.

The memory (storing unit) 1520 buffers (temporarily stores) the received contents. Then, the storing unit 1520 may store the storage preventer.

The processor 1530 reproduces contents buffered in the storing unit 1520. Here, the processor 1530 allows the contents to be buffered by executing the storage preventer, but prevents the contents from being permanently stored.

To this end, the processor 1530 detects a process being processed (or executed) in the client 1500. If the detected process is consistent with predetermined information, the processor 1530 prevents the contents from being permanently stored. In order to prevent the contents from being permanently stored, the detected process is ended, or prevented, or deterred.

The processor 1530 monitors a process being processed in the client 1500. If a preset event is detected, the processor 1530 prevents the contents from being permanently stored.

As aforementioned, as the method for preventing contents from being stored, may be used various methods, such as a method for stopping a process including a storage function (or a recording function), a method for automatically stopping an application for reproducing contents, or a method for preventing contents from being outputted to a user interface (UI) screen reproduced through the application, or a method for outputting a modulated contents to the user interface (UI) screen reproduced through the application.

The processor 1530 may execute some or all of the functions of the process detector 1211, the recorder detector 1213, the storage preventing module 1214, the process detector 1311, the process insertion unit 1312, the screen modulator 1313, etc.

The server 900 includes a transceiver 910, a memory 920, and a process 930. Here, the server 900 may be a contents server 600, a management server 700, or a storage prevention server 800. The server 900 may be any combinations among the contents server 600, the management server 700, and the storage prevention server 800.

The transceiver 910 may send contents or may send, to the client, information about a program, a resource, a code, and a library to be executed in the client 1500 for storing the contents. The transceiver 910 may send, to the contents server 600, a signal for stopping sending of contents.

The memory or storing unit 920 may store the content, or may store the information.

Based on information of contents sent to the client 1000 from the contents server 600, the processor 930 reads recorder information, and sends the read recorder information to the client 1500 through the communication network 500.

The present invention has the following effects.

Firstly, since contents are prevented from being stored, contents having copyrights can be protected.

Secondly, even at the time of storing contents being output, the contents are prevented from being stored.

Thirdly, contents are prevented from being stored without increasing a processing amount for a process by a CPU of the client.

Fourthly, even when a protection of contents is not easy due to a newly developed storage program, contents are prevented from being stored.

Fifthly, even when the storage preventer is not installed at the client by a user, contents is prevented from being stored.

Sixthly, even when storage programs for storing contents defend themselves from being ended, contents are prevented from being stored.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

INDUSTRIAL APPLICABILITY

The present invention teachings that offer protection against unauthorized copying of digital media contents can be applied to various fields of technology related to providing digital media contents services.

What is claimed is:

1. A method of protecting digital media content, the method comprising:

monitoring, by a process monitoring driver which is connected to an application software program, process resource related to the application software program while the digital media content is being reproduced in a client;

detecting an occurrence of an execution or ending of the application software program;

receiving process resource information only when the execution or ending of the application software program is detected, in order to minimize a processing amount for a processor;

collecting a process ID and related information from the process monitoring driver if the process resource information is not received;

analyzing the process resource information or the process ID and related information;

determining whether a malicious routine or codes relating to a recording function is included therein; and executing a procedure to protect against unauthorized copying of the digital media content, if the malicious routine or codes relating to a recording function is included, wherein the process resource information is analyzed by determining whether the malicious code or routine matched with the recording function, and wherein the related information includes a name of a process and version information.

2. The method of claim 1, wherein the procedure comprises: refraining to send the digital media content to the client device.

3. The method of claim 2, wherein the refraining step comprises: disabling the digital media content from being transmitted to the client device.

4. The method of claim 1, wherein the procedure comprises: sending the digital media content together with distortion information.

5. The method of claim 4, wherein the distortion information provides user experience of the digital media content that is degraded in at least one of a visual manner, an audible manner, and a tactile manner.

6. The method of claim 1, wherein the procedure comprises: sending alternative information other than the actual digital media content.

7. The method of claim 6, wherein the alternative information is related to at least one of commercial or non-commercial advertisements, entertainment, announcements, personalized data, and other information useful to a user of the client device.

8. The method of claim 1, wherein the procedure comprises:

sending an indication to the client device indicating that storing is unauthorized.

9. The method of claim 8, wherein the indication comprises at least one of a warning about unauthorized copying, ways to obtain authorization for copying, and information useful to a user of the client device.

10. The method of claim 1, wherein the procedure comprises:

instructing the client device to disable its storing function.

11. The method of claim 10, wherein the step of instructing comprises:

triggering a prevention function that is enabled in the client device to prevent the digital media content from being copied in the client device or copied via the client device.

12. A record prevention device for protecting digital media content comprising:

a process monitoring driver which is connected to an application software program configured to monitor process resource related to the application software program while the digital media content is being reproduced in a client;

an event detector configured to detect an occurrence of an execution or ending of the application software program and to receive process resource information only when the execution or ending of the application software program is detected, in order to minimize a processing amount for a processor;

a process information collector configured to collect a process ID and related information from the process monitoring driver if the process resource information is not received;

a process resource analyzer configured to analyze the process resource information or the process ID and related information, and to determine whether a malicious routine or codes relating to a recording function is included in the collected process resource information; and a storage preventer module configured to execute a procedure to protect against unauthorized copying of the digital media content, if the malicious routine or codes relating to a recording function is included, wherein the process resource information is analyzed by determining whether the malicious code or routine matched with the recording function, and wherein the related information includes a name of a process and version information.

13. The record prevention device of claim 12, wherein the procedure performed by the storage preventer module comprises at least one of:

refraining to send the digital media content to the client device;

sending the digital media content together with distortion information;

sending alternative information other than the actual digital media content;

sending an indication to the client device indicating that storing is unauthorized; and instructing the client device to disable its storing function.

14. The record prevention device of claim 13, wherein the procedure performed by the storage preventer module is further characterized in that:

wherein the refraining step comprises, disabling the digital media content from being transmitted to the client device;

wherein the distortion information provides user experience of the digital media content that is degraded in at least one of a visual manner, an audible manner, and a tactile manner;

wherein the alternative information is related to at least one of commercial or non-commercial advertisements, entertainment, announcements, personalized data, and other information useful to a user of the client device;

wherein the indication comprises at least one of a warning about unauthorized copying, ways to obtain authorization for copying, and information useful to a user of the client device; and wherein the step of instructing comprises, triggering a prevention function that is enabled in the client device to prevent the digital media content from being copied in the client device or copied via the client device.

15. The record prevention device of claim 12, wherein the procedure performed by the storage preventer module comprises:

transmitting, to a content provision server, which transmits the digital media content to the client, a request for stopping the transmission of the digital media content.

* * * * *